US010352529B2

(12) United States Patent
Smith et al.

(10) Patent No.: US 10,352,529 B2
(45) Date of Patent: Jul. 16, 2019

(54) COLLIMATING OPTIC FOR LED ILLUMINATION ASSEMBLY HAVING TRANSVERSE SLOTS ON EMISSION SURFACE

(71) Applicant: Whelen Engineering Company, Inc., Chester, CT (US)

(72) Inventors: Todd J. Smith, Deep River, CT (US); Kyle Shimoda, Middletown, CT (US)

(73) Assignee: Whelen Engineering Company, Inc., Chester, CT (US)

( * ) Notice: Subject to any disclaimer, the term of this patent is extended or adjusted under 35 U.S.C. 154(b) by 0 days.

(21) Appl. No.: 15/848,930

(22) Filed: Dec. 20, 2017

(65) Prior Publication Data

US 2018/0135831 A1 May 17, 2018

Related U.S. Application Data

(63) Continuation-in-part of application No. 15/383,039, filed on Dec. 19, 2016, now Pat. No. 10,139,079, which is a continuation of application No. 14/246,057, filed on Apr. 5, 2014, now Pat. No. 9,523,480.

(51) Int. Cl.
| | |
|---|---|
| *F21V 5/04* | (2006.01) |
| *F21V 13/04* | (2006.01) |
| *G02B 19/00* | (2006.01) |
| *F21V 7/06* | (2006.01) |
| *F21V 7/04* | (2006.01) |
| *F21Y 115/10* | (2016.01) |

(Continued)

(52) U.S. Cl.
CPC ............. *F21V 5/04* (2013.01); *F21V 13/04* (2013.01); *G02B 19/0023* (2013.01); *G02B 19/0061* (2013.01); *F21V 7/04* (2013.01); *F21V 7/048* (2013.01); *F21V 7/06* (2013.01); *F21Y 2101/00* (2013.01); *F21Y 2105/10* (2016.08); *F21Y 2115/10* (2016.08)

(58) Field of Classification Search
CPC ........... F21V 7/0083; F21V 7/09; F21V 5/045
See application file for complete search history.

(56) References Cited

U.S. PATENT DOCUMENTS

| | | | |
|---|---|---|---|
| 1,888,995 A | 11/1932 | Matter | |
| 2,215,900 A * | 9/1940 | Bitner | F21V 5/04 362/309 |

(Continued)

FOREIGN PATENT DOCUMENTS

WO    2002014738 A1    2/2002

*Primary Examiner* — Ismael Negron
(74) *Attorney, Agent, or Firm* — Alix, Yale & Ristas, LLP

(57) ABSTRACT

A beam forming optic for use with an LED having an optical axis. The beam forming optic includes a first light entry surface cooperating with a first light emission surface and a second light entry surface cooperating with an internal reflecting surface and a second light emission surface to redirect a portion of the light emitted by the LED divergent from the optical axis into a direction substantially parallel with the optical axis. A polygonal periphery extends from the internal reflecting surface to the second light emission surface. A void is defined by a lateral channel and a longitudinal gap extending from the second light emission surface towards the first light emission surface. A portion of the light emitted from the LED passes through the void.

18 Claims, 22 Drawing Sheets

(51) Int. Cl.
*F21Y 105/10* (2016.01)
*F21Y 101/00* (2016.01)

(56) References Cited

U.S. PATENT DOCUMENTS

| | | | |
|---|---|---|---|
| 2,254,962 A | 9/1941 | Harris et al. | |
| 2,282,167 A | 5/1942 | Cullman | |
| 3,774,023 A | 11/1973 | Cobarg et al. | |
| 4,254,453 A | 3/1981 | Mouyard et al. | |
| 4,767,172 A * | 8/1988 | Nichols | F21V 7/0091 |
| | | | 355/1 |
| 4,770,514 A * | 9/1988 | Silverglate | G02B 19/0028 |
| | | | 359/708 |
| 4,914,731 A | 4/1990 | Chen | |
| 5,103,381 A | 4/1992 | Uke | |
| 5,526,190 A * | 6/1996 | Hubble, III | F21V 7/0091 |
| | | | 347/102 |
| 5,757,557 A * | 5/1998 | Medvedev | F21L 4/027 |
| | | | 359/708 |
| 5,894,196 A * | 4/1999 | McDermott | H01J 61/025 |
| | | | 257/E33.059 |
| 6,473,238 B1 | 10/2002 | Daniell | |
| 6,536,923 B1 * | 3/2003 | Merz | F21V 7/0091 |
| | | | 362/327 |
| 6,547,249 B2 | 4/2003 | Collins, III et al. | |
| 6,547,423 B2 * | 4/2003 | Marshall | F21V 5/04 |
| | | | 257/E33.072 |
| 6,724,543 B1 * | 4/2004 | Chinniah | F21V 5/008 |
| | | | 359/718 |
| 6,773,139 B2 | 8/2004 | Sommers | |
| 6,986,593 B2 | 1/2006 | Rhoads et al. | |
| 7,001,047 B2 | 2/2006 | Holder et al. | |
| 7,070,310 B2 | 7/2006 | Pond | |
| 7,083,304 B2 | 8/2006 | Rhoads et al. | |
| 7,114,832 B2 | 10/2006 | Holder et al. | |
| 7,172,319 B2 | 2/2007 | Holder et al. | |
| 7,207,700 B2 * | 4/2007 | Fallahi | F21V 5/045 |
| | | | 362/334 |
| 7,246,917 B2 | 7/2007 | Rhoads et al. | |
| 7,284,871 B2 | 10/2007 | Don et al. | |
| 7,331,681 B2 | 2/2008 | Pohlert et al. | |
| 7,427,167 B2 | 9/2008 | Holder et al. | |
| 7,438,447 B2 | 10/2008 | Holder et al. | |
| 7,473,013 B2 * | 1/2009 | Shimada | F21V 5/04 |
| | | | 257/98 |
| 7,618,160 B2 | 11/2009 | Chinniah et al. | |
| 7,652,274 B2 | 1/2010 | Wernersson | |
| 7,674,018 B2 | 3/2010 | Holder et al. | |
| 7,850,334 B2 | 12/2010 | Holder et al. | |
| 7,850,345 B2 | 12/2010 | Holder et al. | |
| 7,896,521 B2 | 3/2011 | Becker et al. | |
| 7,918,583 B2 * | 4/2011 | Chakmakjian | F21V 5/007 |
| | | | 362/237 |
| 7,993,036 B2 | 8/2011 | Holder et al. | |
| 8,485,692 B2 | 7/2013 | Li | |
| 8,947,527 B1 | 2/2015 | Postovalov et al. | |
| 2008/0192477 A1 | 8/2008 | Holder et al. | |
| 2008/0198604 A1 * | 8/2008 | Kim | F21V 5/008 |
| | | | 362/293 |
| 2008/0205061 A1 | 8/2008 | Holder et al. | |
| 2008/0259631 A1 | 10/2008 | Holder et al. | |
| 2009/0016052 A1 | 1/2009 | Holder et al. | |
| 2009/0021945 A1 | 1/2009 | Holder et al. | |
| 2009/0043544 A1 | 2/2009 | Holder et al. | |
| 2009/0310345 A1 | 12/2009 | Holder et al. | |
| 2010/0128489 A1 | 5/2010 | Holder et al. | |
| 2010/0134046 A1 | 6/2010 | Holder et al. | |
| 2010/0165625 A1 | 7/2010 | Holder et al. | |
| 2010/0172135 A1 | 7/2010 | Holder et al. | |
| 2010/0238669 A1 | 9/2010 | Holder et al. | |
| 2016/0061389 A1 | 3/2016 | Dong | |

\* cited by examiner

COLLIMATING OPTIC FOR LED ILLUMINATION ASSEMBLY HAVING TRANSVERSE SLOTS ON EMISSION SURFACE

BACKGROUND

The present invention relates generally to optical systems for distributing light from a light source and more particularly to a beam forming optical system for an individual LED light source.

Commercially available LEDs have characteristic spatial radiation patterns with respect to an optical axis which passes through the light emitting die. A common characteristic of all of LED radiation patterns is that light is emitted from one side of a plane containing the light emitting die in a pattern surrounding the LED optical axis, which is perpendicular to the plane. Light generated by an LED is radiated within a hemisphere centered on the optical axis. The distribution of light radiation within this hemisphere is determined by the shape and optical properties of the lens (if any) covering the light emitting die of the LED. Thus, LEDs can be described as "directional" light sources, since all of the light they generate is emitted from one side of the device.

For purposes of this application, light emitted from an LED can be described as "narrow angle" light emitted at an angle of less than about 35° from the optical axis and "wide angle" light emitted at an angle of more than about 35° from the optical axis. The initial "emitted" trajectory of wide angle and narrow angle light may necessitate manipulation by different portions of a reflector and/or optical element to provide the desired illumination pattern.

The use of LEDs in warning and signaling lights is well known. Older models of LEDs produced limited quantities of light over a relatively narrow viewing angle centered on an optical axis of the LED. These LEDs were typically aggregated in compact arrays to fill the given illuminated area and provide the necessary light output. More recently developed high output LEDs produce significantly greater luminous flux per component, permitting fewer LEDs to produce the luminous flux required for many warning and signaling applications. It is known to arrange a small number of high-output LEDs in a light fixture and provide each high-output LED with an internally reflecting (TIR) collimating lens. The collimating lens organizes light from the LED into a collimated beam centered on the LED optical axis. Such an arrangement typically does not fill the light fixture, resulting in an undesirable appearance consisting of bright, circular spots arranged against an unlit background. Light-spreading optical features on the outside lens/cover are sometimes employed to improve the appearance and optical performance of the light fixture. The most common configuration for such TIR lenses is circular, but housings may be elongated and rectangular, resulting in an aesthetic mismatch between the resulting illumination pattern and the housing geometry.

This application will address optical arrangements for modifying the emitted trajectory of light from an LED with respect to a reference line. For purposes of this application, "collimated" means "re-directed into a trajectory substantially parallel with a reference line." Substantially parallel refers to a trajectory within 5° of parallel with the reference line. For an LED mounted to a vertical surface, light is emitted in a hemispherical pattern centered on the optical axis of the LED, which is perpendicular to the vertical surface, i.e., the optical axis of the LED is horizontal.

FIG. 18 schematically illustrates a prior art collimator of a configuration frequently employed in conjunction with LED light sources. Light from an LED positioned in a cavity defined by the collimator is organized into a collimated beam aligned with the optical axis of the LED. The known internally reflecting collimator for an LED is a molded solid of light transmissive plastic such as acrylic or polycarbonate. The radial periphery of the collimator is defined by an aspheric internal reflecting surface flaring upwardly and outwardly to a substantially planar light emission surface. The bottom of the collimator includes a cavity centered over the LED optical axis. The cavity is defined by a substantially cylindrical side-wall and an aspheric upper surface. The aspheric upper surface is configured to refract light emitted at small angles relative to the LED optical axis to a direction parallel with the LED optical axis. The shape of the aspheric upper surface is calculated from the refractive properties of the air/solid interface, the position of the LED point of light emission relative to the surface, the configuration of the surface through which the light will be emitted, and the desired direction of light emission, e.g., parallel to the LED optical axis. The mathematical relationship between the angle of incidence of a light ray to a surface and the angle of the refracted ray to the surface is governed by Snell's Law: "The refracted ray lies in the plane of incidence, and the sine of the angle of refraction bears a constant ratio to the sine of the angle of incidence." ($\sin \theta/\sin \theta'$=constant, where $\theta$ is the angle of incidence and $\theta'$ is the angle of refraction)

For any particular point on the substantially cylindrical side-wall, the path of light refracted into the collimator can be calculated using Snell's law. The shape of the peripheral aspheric internal reflecting surface is calculated from the path of light refracted by the substantially cylindrical side-wall surface, the configuration of the surface through which light will be emitted, and the desired direction of light emission, e.g., parallel to the LED optical axis. The resulting aspheric internal reflecting surface redirects light incident upon it in a direction parallel to the optical axis of the LED.

The result is that substantially all of the light emitted from the LED is redirected parallel to the optical axis of the LED to form a collimated beam. This arrangement efficiently gathers light from the LED and redirects that light into a direction of intended light emission. Unless the light is somehow spread, the light from each LED appears to the viewer as a bright spot the size and shape of the collimator, which is circular. It is typically less efficient to collimate light and then re-direct the collimated light into a desired pattern than it is to modify only those components of the emitted trajectory that do not contribute to the desired emission pattern, while leaving desirable components of the emitted trajectory undisturbed. A lens or reflecting surface in the form of a surface of rotation centered on the optical axis of the LED, if properly configured, can modify the trajectory of emitted light relative to the optical axis, whereas other surface configurations will only modify components of the trajectory, resulting in light emission that is not collimated with respect to the optical axis of the LED. This explains the surface configurations employed in most collimating optical systems.

SUMMARY

A beam forming optic for use with an LED is disclosed. The LED has an optical axis centered on an area of light emission from which light is emitted in a hemispherical pattern surrounding the optical axis. The light is emitted to one side of a first plane behind the LED and perpendicular to the optical axis.

The beam forming optic includes a first light entry surface configured to cooperate with a first light emission surface to redirect a portion of the light emitted by the LED divergent from the optical axis into a direction substantially parallel with the optical axis. A second light entry surface is configured to cooperate with an internal reflecting surface and a second light emission surface to redirect a portion of the light emitted by the LED divergent from the optical axis into a direction substantially parallel with the optical axis. A polygonal periphery extends from the internal reflecting surface to the second light emission surface.

A void is defined by a lateral channel and a longitudinal gap extending from the second light emission surface towards the first light emission surface. The channel and gap interrupt the polygonal periphery and intersect one another at the optical axis.

Most of the light emitted from the LED that is incident on the second light entry surface is incident on the internal reflecting surface. The first and second light entry surfaces cooperate to prevent the light emitted from the LED from contacting the polygonal periphery. A portion of the light emitted from the LED passes through the void.

DETAILED DESCRIPTION OF THE DISCLOSED EMBODIMENTS

Figure 1:
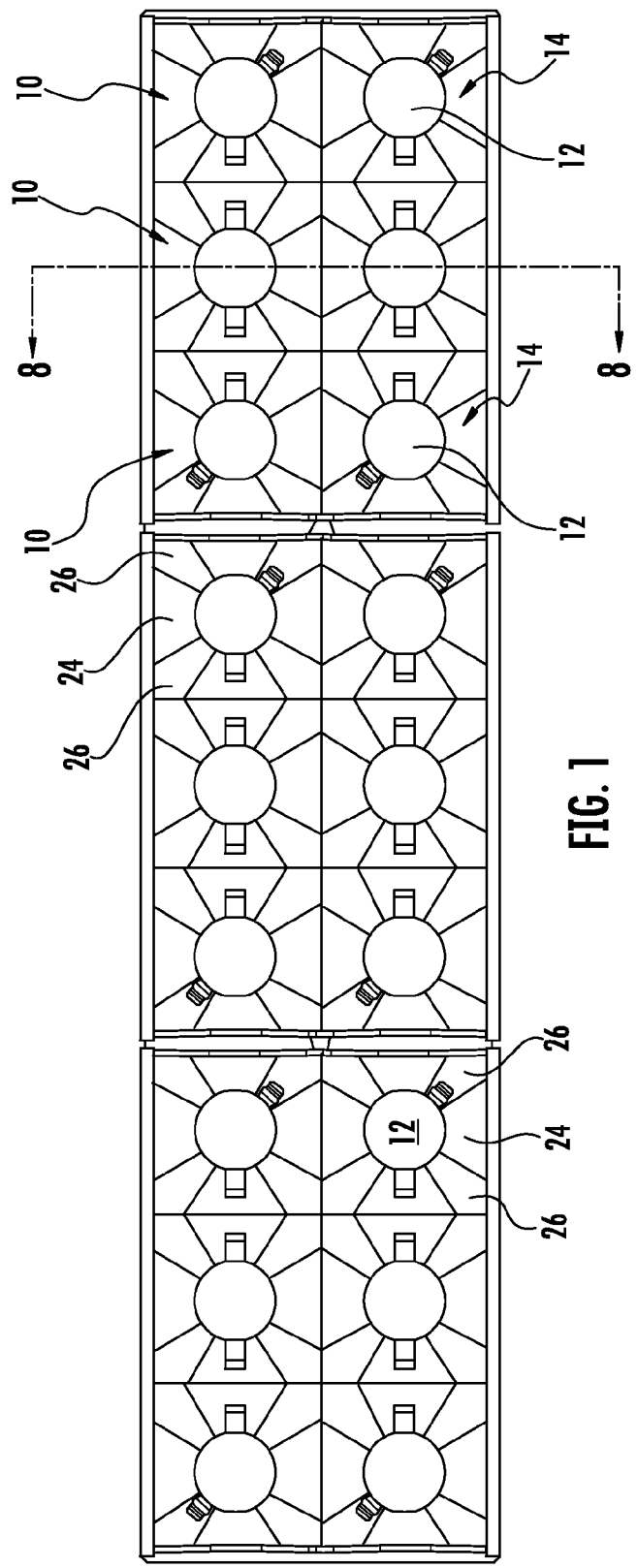
FIG. 1 is a front elevation view of an embodiment of the disclosed beam forming optic in an assembly employing three groups of six beam forming optics according to aspects of the disclosure.
Figure 2:
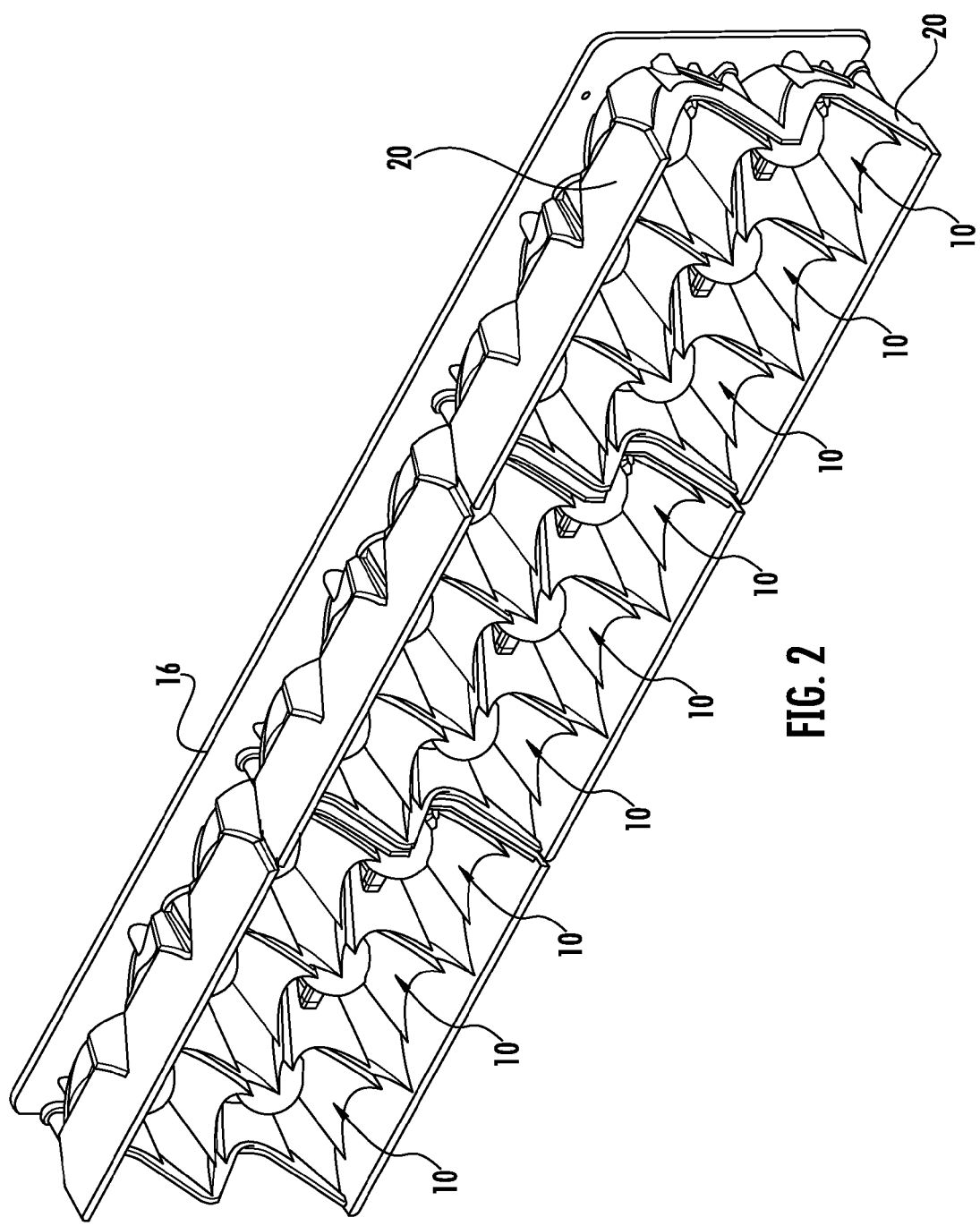
FIG. 2 is a top perspective view of the assembly shown in FIG. 1.
Figure 3:
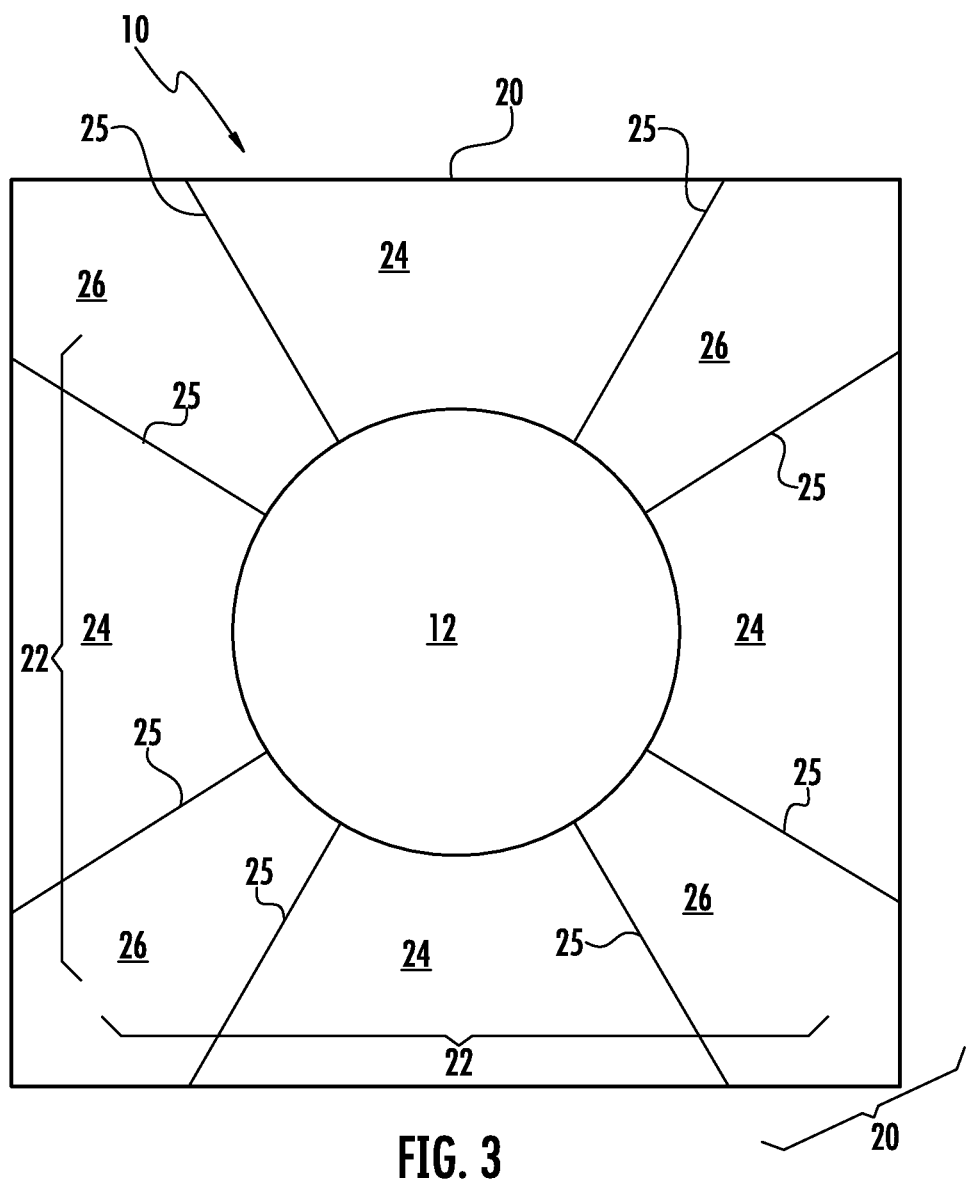
FIG. 3 is an enlarged front elevation view of a single beam forming optic according to aspects of the disclosure.
Figure 4:
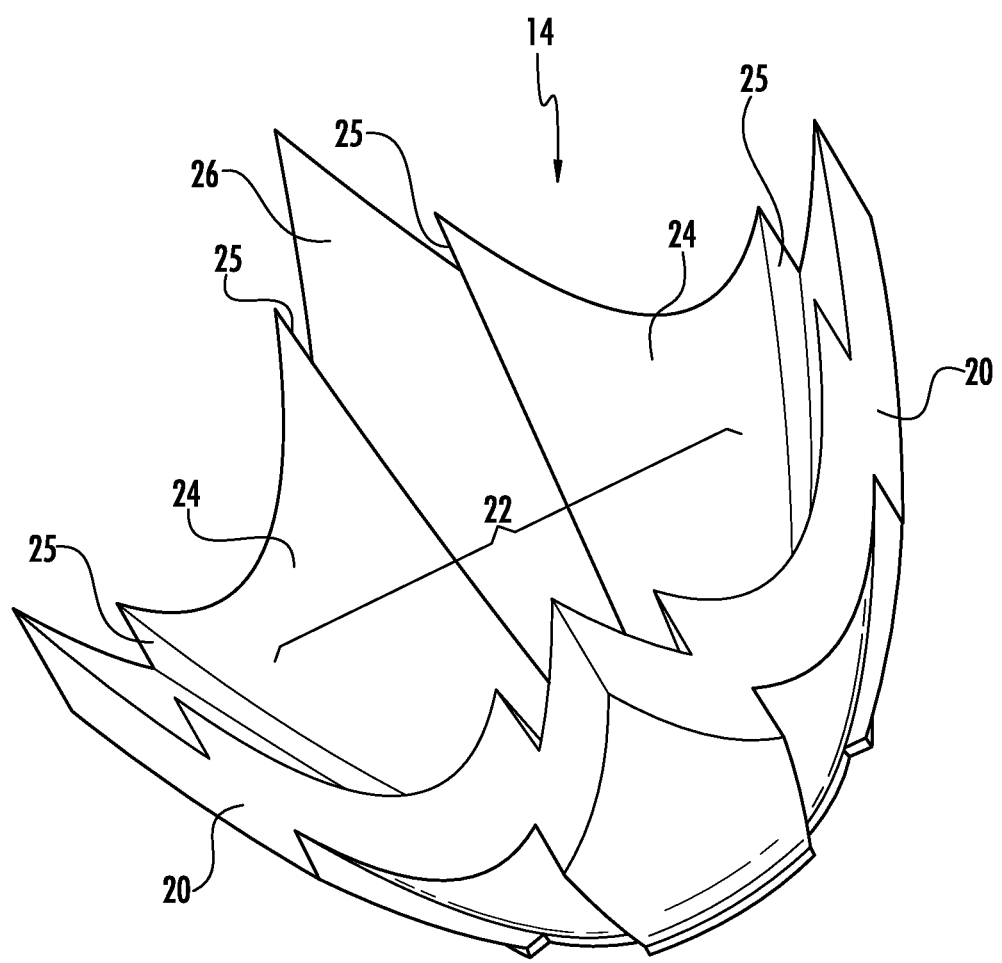
FIG. 4 is a side perspective view of a reflector compatible with the beam forming optic of FIG. 3.
Figure 5:
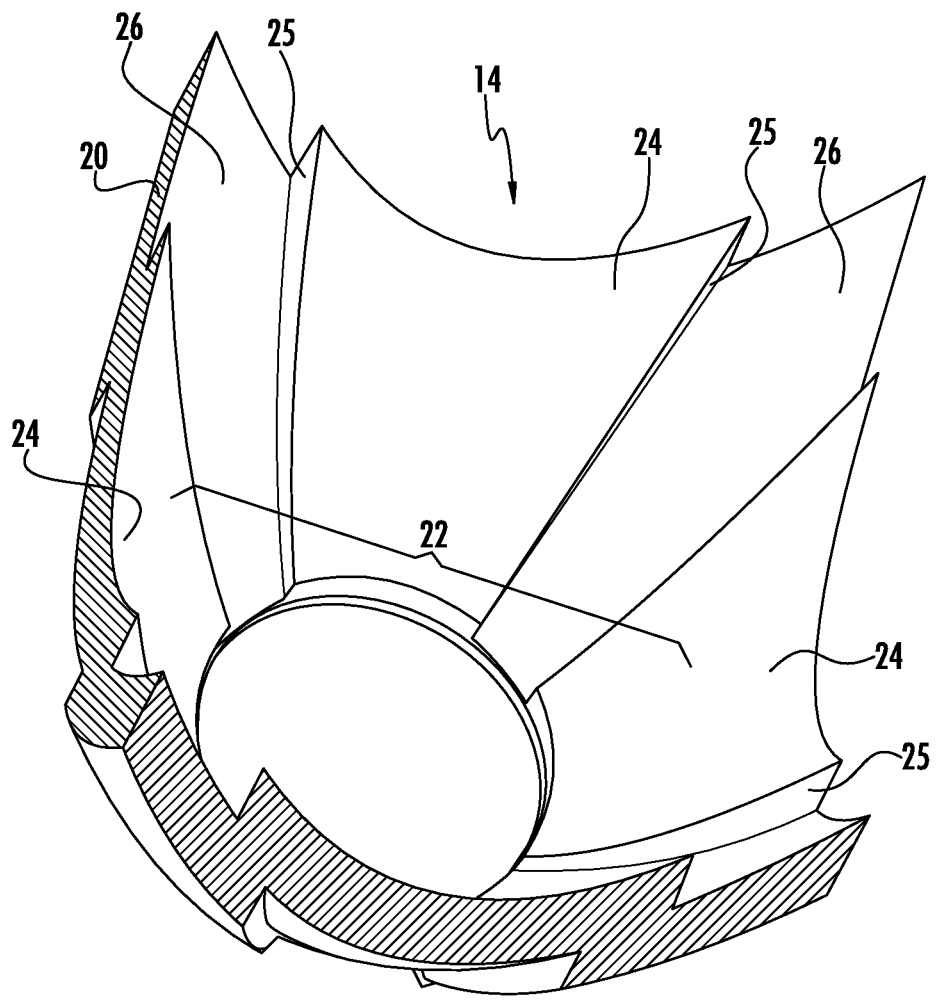
FIG. 5 is a top perspective view of the reflector of FIG. 4.
Figure 6:
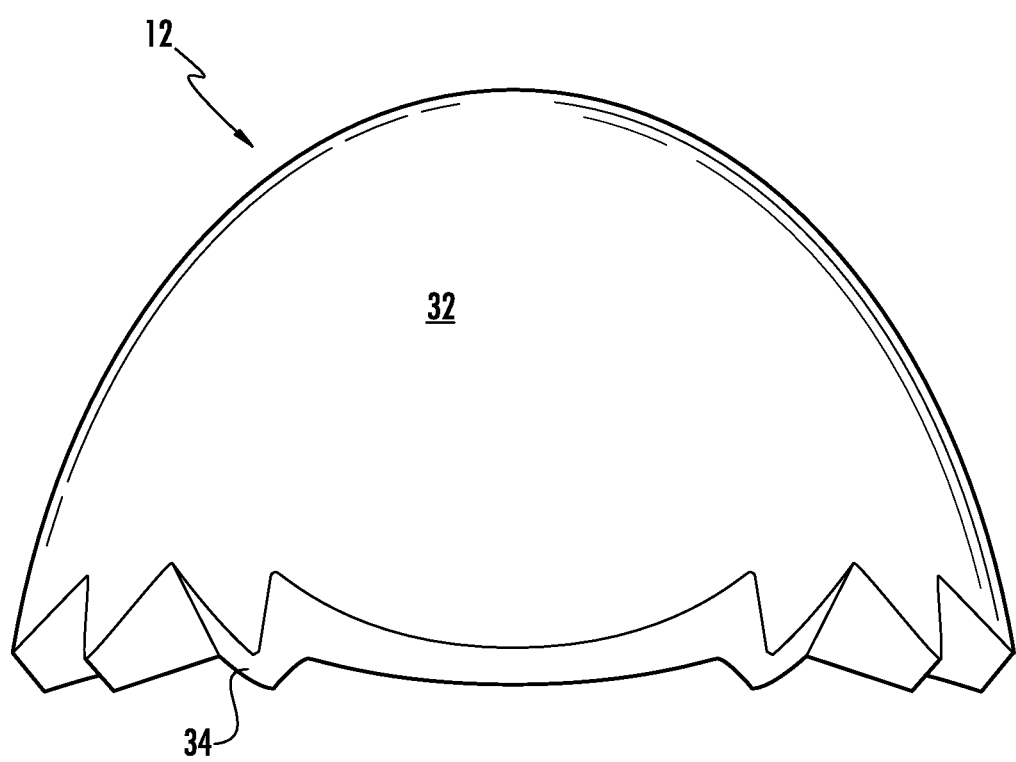
FIG. 6 is a side view of a lens compatible with the beam forming optic of FIG. 3.
Figure 7:
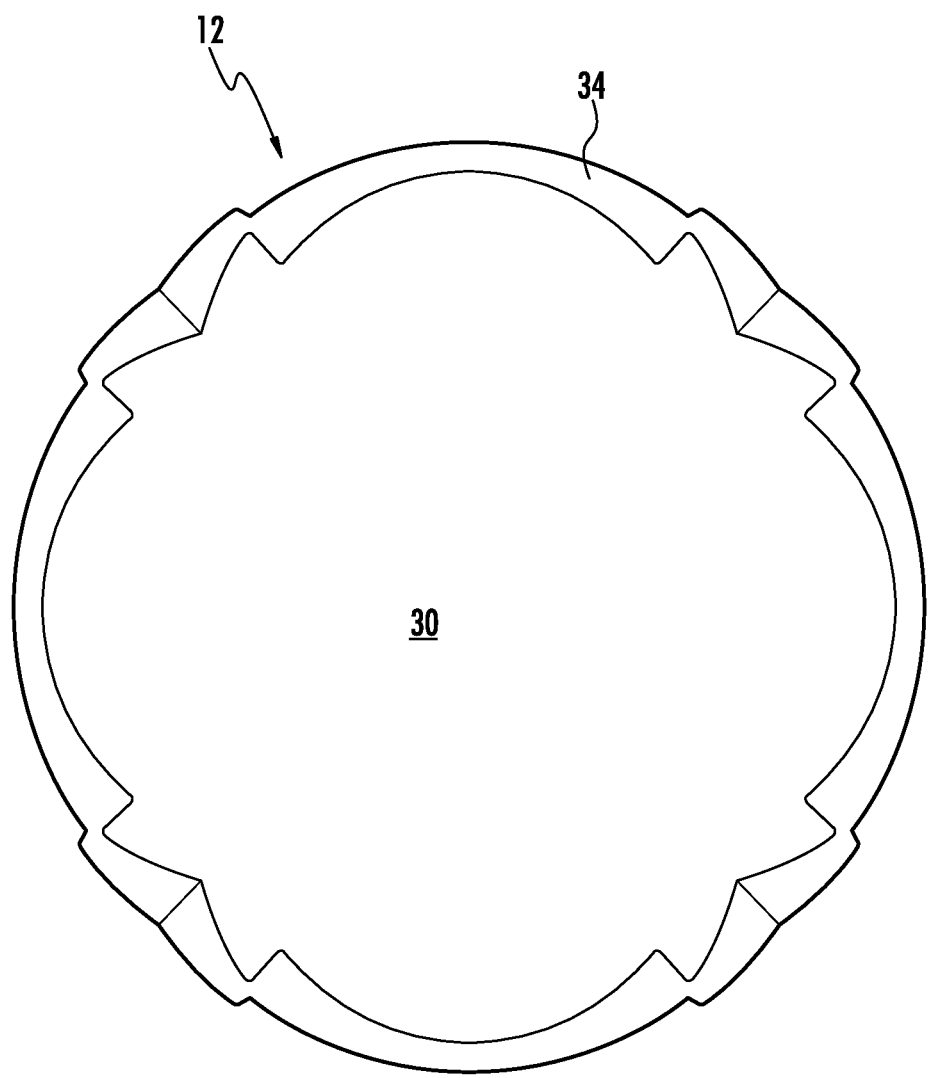
FIG. 7 is a bottom plan view of the lens of FIG. 6.
Figure 8:
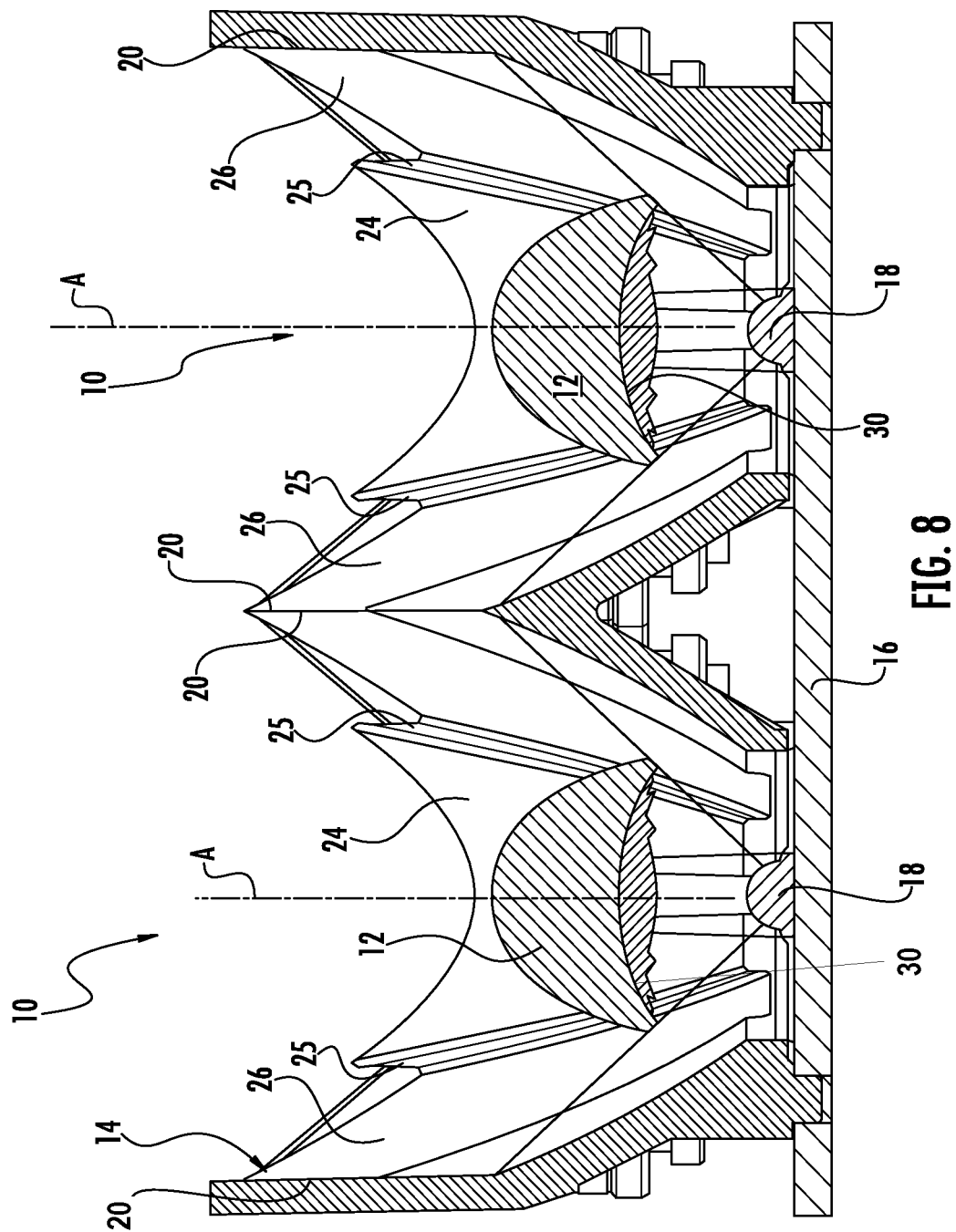
FIG. 8 is an enlarged sectional view through the assembly of FIG. 1, taken along line 8-8 thereof.

A first embodiment of a beam forming optic according to the disclosure will be discussed with reference to FIGS. 1-9. FIGS. 1 and 2 and 8 illustrate an array of three groups of six beam forming optics 10 according to aspects of the disclosure. The illustrated array is one example of how groups of the disclosed beam forming optics can be organized and an example of one compatible polygonal shape. The disclosed optic is not limited to the illustrated arrangements or geometries. Each beam forming optic 10 includes a lens 12 and a peripheral reflector 14.

Figure 10:
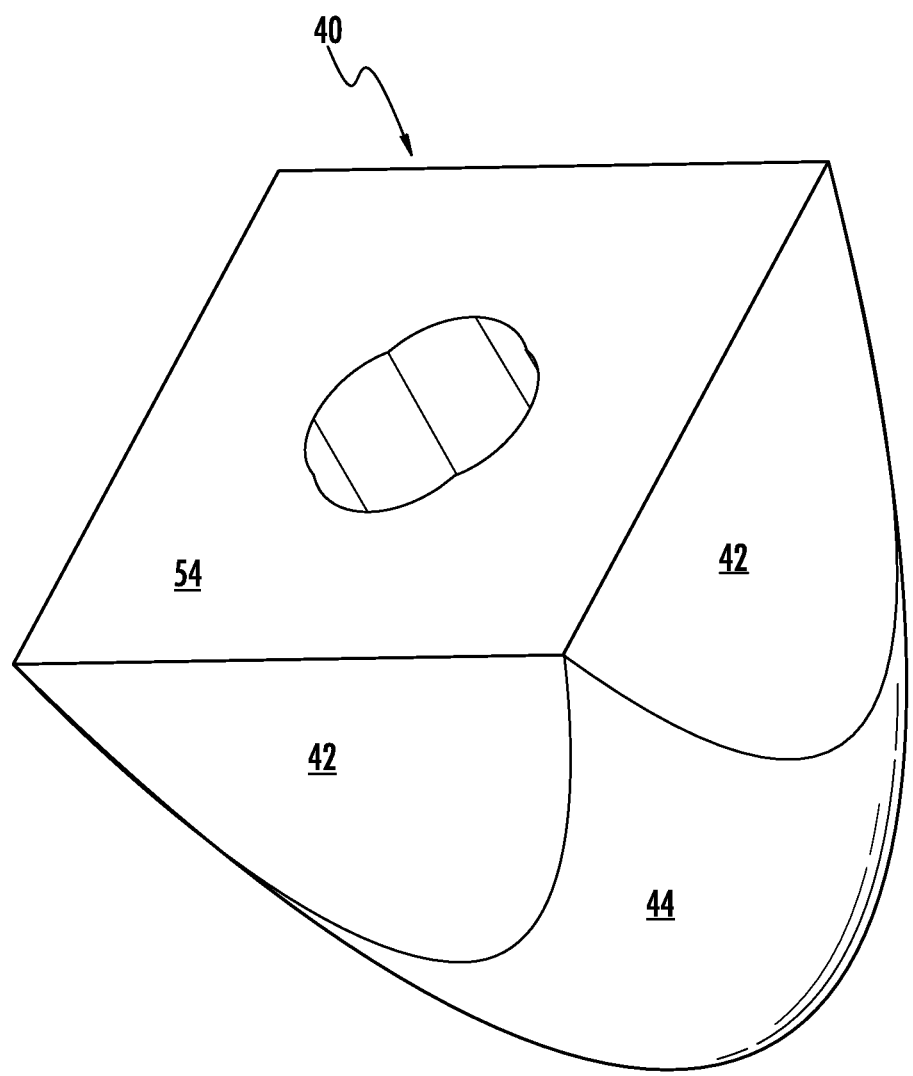
FIG. 10 is a top perspective view of an alternative beam forming optic according to aspects of the disclosure.

In the array illustrated in FIGS. 1, 2 and 10, the reflectors are molded in groups of six and the lenses 12 are molded in groups of three. The lenses 12 may be connected by structures that align and support the lens relative to the reflectors 14. The reflectors 14 and lenses of each of the groups of beam forming optics are mounted to a PC board 16 to which the LEDs 18 are mounted. The PC board 16 is typically secured in thermal contact with a heat sink to remove heat from the assembly as is known in the art. The modular configuration of the disclosed beam forming optic 10 allows for great flexibility in the configuration of a light assembly. The beam forming optics 10 can be arranged in single rows, blocks or multi-row bar configurations. Changes to the geometry of the reflector periphery allow the disclosed beam forming optic to conform to a variety of housing shapes and configurations.

Each of the illustrated beam forming optics 10 of the array of six is configured to form a beam from the light emitted from a single LED 18 arranged as illustrated in FIG. 8. The beam forming optic 10 is designed with a focus coincident with the area of light emission of the LED 18. The surfaces of the lens 12 and the reflector 14 may be defined by mathematical formulas having a focus at a point intended to be centered on the die of the LED 18. The light emitting die of an LED 18 is not a point source of light, with the result that surfaces designed to collimate light from a point source cannot form a perfectly collimated beam from light emitted from a typical LED.

Each reflector 14 has a square periphery 20 that meets the periphery 20 of an adjacent reflector 14 or a border of the array or housing (not shown). Each optic 10 is configured to collimate light from the LED 18 into a beam that appears to illuminate the entire square occupied by the optic 10 when observed from a vantage point close to aligned with the direction of light emission from the array. Groups of the disclosed optics 10 provide a substantially collimated beam in the shape of the array. Each reflector 14 supports a reflecting surface 22 defined by two different parabolic curves rotated about an optical axis A of the LED. A first parabolic curve is rotated about axis A to define parabolic reflecting surface segments 24 in the middle of each side of the reflector 14. A second parabolic curve is rotated about axis A to define reflecting surface segments 26 that extend into the corners of the reflector 14. The first parabolic curve has a shorter focal length than the second parabolic curve placing reflecting surface segment 24 closer to axis A than reflecting surface segments 26. Radial bypass surfaces 25 connect reflecting surface segments 24 and 26, but are oriented to minimize re-direction of light from the LED 18. Employing the second parabolic curve (which defines corner reflecting surface segments 26) to define the entire reflecting surface 22 would result in very deep notches in each side of the square reflector 14. As will be discussed in greater detail below, such a deeply notched reflecting surface is less efficient than the composite reflecting surface 22 of the disclosed reflector 14.

The lens 12 is situated in the center of the reflector 14 and configured to re-direct light from the LED 18 not incident upon the reflecting surface 22 composed of reflecting surface segments 24, 26. The lens 12 is defined by a light entry surface 30, a light emission surface 32 and a convoluted peripheral bypass surface 34. The peripheral bypass surface 34 defines the periphery of both the light entry surface 30 and the light emission surfaces 34. To maximize the efficiency of the beam forming optic, the lens 12 and reflector 14 are configured to intercept and re-direct substantially all the light emitted from the LED 18 into a substantially collimated beam. The composite configuration of the reflecting surface 22 and the polygonal periphery 20 must be accounted for in the design of the lens 12 to ensure substantially all light is re-directed by one or the other of the lens 12 or reflector 14, but very little light is re-directed by both the lens 12 and reflector 14.

Figure 9:
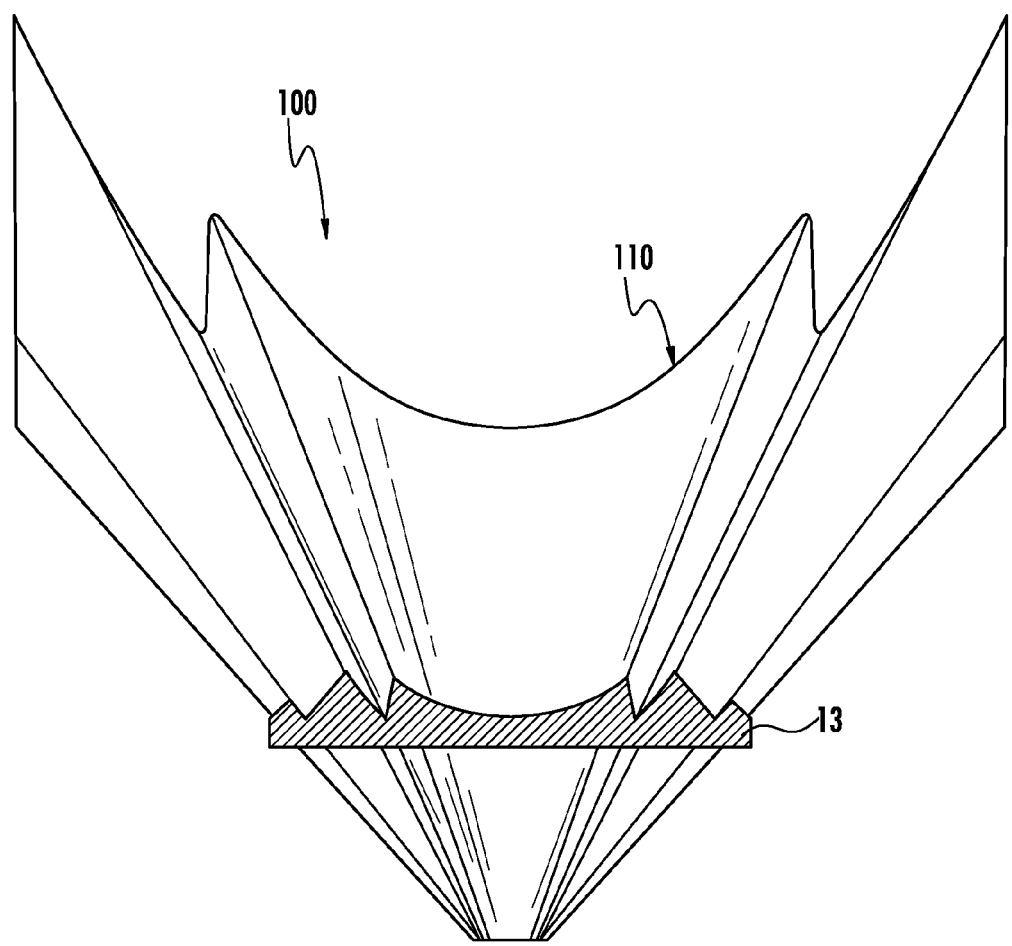
FIG. 9 illustrates the path of light emitted from the light source and incident upon the reflecting surface and the intersection of that path with the peripheral bypass surface defining the periphery of the light entry and light emission surfaces of an exemplary lens according to aspects of the disclosure.

FIG. 9 illustrates a three dimensional shape 100 defined by the trajectory of light emitted from the LED 18 having the smallest angle relative to axis A that will be incident upon the reflecting surface 22. Those skilled in the art will recognize that the upper edge 110 of the shape 100 coincides with the upper edge of the reflecting surface 22. FIG. 9 also illustrates a marginal portion 13 of a circular lens that would extend beyond the trajectory of light incident upon the reflecting surface 22. A lens having the circular marginal portion 13 illustrated in FIG. 9 would intercept and re-direct light that could be used to fill the upper margins of the reflecting surface 22, resulting in dark margins surrounding each beam forming optic 10. According to aspects of the disclosure, the path of light from the LED 18 having the smallest angular displacement from axis A that is incident upon the reflecting surface 22 (the shape shown in FIG. 9) is employed to define a peripheral bypass surface 34 of the lens 12. The shape and angular orientation of the peripheral bypass surface 34 is configured to allow light incident upon the reflecting surface 22 to pass by the lens 12, and to intercept and re-direct light having a smaller angular displacement from axis A than the trajectories defined by shape 100. Notches in the periphery of the lens 12 allow light from the LED 18 to radiate to the upper margins of the reflecting surface 22, for example the upper margin of corner reflecting surface segments 26. As a result, substantially all the light emitted from the LED 18 is handled by one or the other of the lens 12 or reflecting surface 22, with little or no overlap.

Another benefit of the disclosed beam forming optic 10 is that light from the LED 18 substantially fills each reflecting surface, so that adjacent beam forming optics 10 form solid blocks or bars of light with little or no dark space from the perspective of an observer close to a direction of the resulting collimated beams.

As best seen in FIG. 8, each lens 12 is supported within the reflector 14 at a pre-determined distance from the LED 18. The position of lens 12 relative to the LED 18 is determined by the focal length of the lens 12. The lens 12 of this embodiment of the disclosed beam forming optic 10 includes a concave light entry surface 30 and a convex light emission surface 32. In the embodiment of FIGS. 1-9, the light entry surface 30 is a spherical surface, while light emission surface 32 is an elliptical surface. Both the light entry surface 30 and the light emission surface 32 are surfaces of rotation centered on axis A and configured to result in a collimating lens having a focus at a point centered on the LED 18 area of light emission. Those skilled in the art will recognize that a collimating lens compatible with the disclosed beam forming optic is not limited to these particular surface configurations. The surface configurations are selected to cooperate to receive and re-direct light from its emitted trajectory to a direction substantially parallel with axis A. The configuration of the light entry surface is matched to a complementary light emission surface to produce a pre-determined result, in this case a substantially collimated beam relative to axis A.

FIGS. 10-17 illustrate a second embodiment of a beam forming optic 40 according to aspects of the disclosure. Beam forming optic 40 is a solid of light transmissive plastic, which may be molded from materials such as acrylic or polycarbonate. Beam forming optic 40 employs refraction and internal reflection to re-direct light emitted from an LED 18 into a beam substantially collimated relative to axis A. Beam forming optic 40 has a square periphery 42, which cuts off a peripheral internal reflecting surface 44 of the optic 40. The square periphery 42 defines a surface which would internally reflect light incident upon it, but such reflected light would not contribute to the substantially collimated beam that is the intended light emission pattern from the optic 40. The shape of the light entry surfaces 46, 48 defining a pocket 50 at the bottom of the optic 40 and light emission surface 52 are modified to ensure that little or no light from the LED 18 is incident upon the inside of the square periphery 42.

Beam forming optic 40 is configured so that light emitted at trajectories relatively close to axis A (narrow angle light) are collimated by cooperating light entry surface 46 and light emission surface 52, while light emitted at trajectories having a relatively large angle with respect to axis A are incident upon and collimated by light entry surface 48 and internal reflecting surface 44. In the illustrated embodiment of a beam forming optic 40, light entry surface 46 is a planar surface and light emission surface 52 is an aspheric surface. Light entry surface 48 is a spherical surface centered on the area of light emission of the LED 18 and internal reflecting surface is a parabolic surface centered on axis A. The surface configuration of the light entry surfaces 46, 48, internal reflecting surface 44 and light emission surfaces 52 and 54 are selected to achieve a pre-determined result, e.g., a beam substantially collimated relative to axis A. Those skilled in the art will recognize that the illustrated surface configurations are only one representative set of surfaces compatible with the collimating function of the optic 40 and other complementary surface configurations may be compatible with the disclosed optic.

Figure 11:
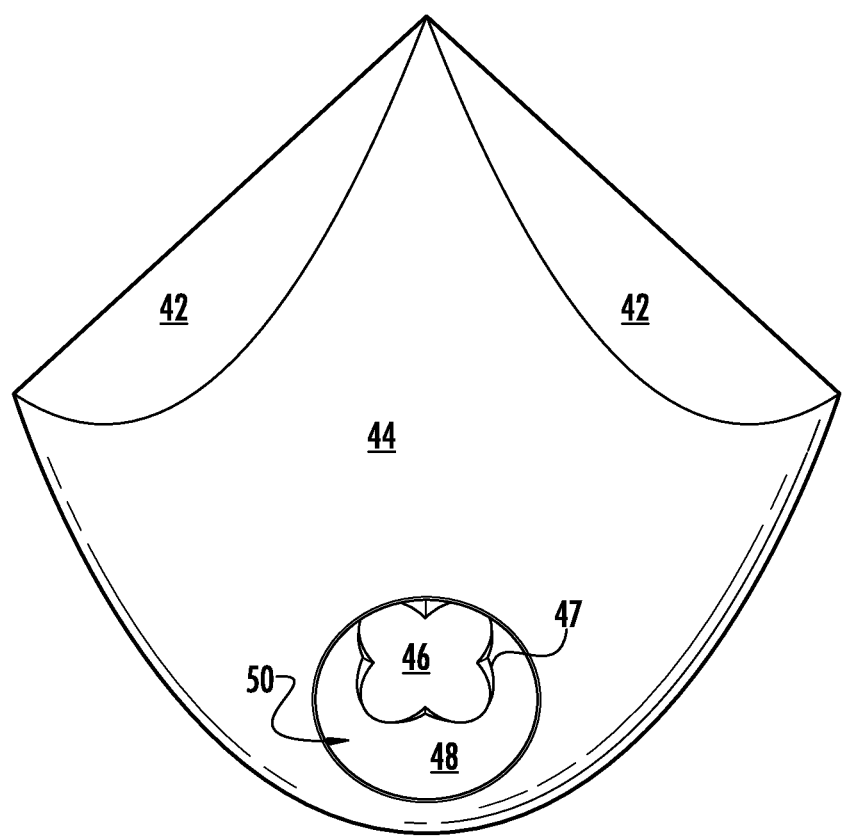
FIG. 11 is a bottom perspective view of the beam forming optic of FIG. 10.
Figure 12:
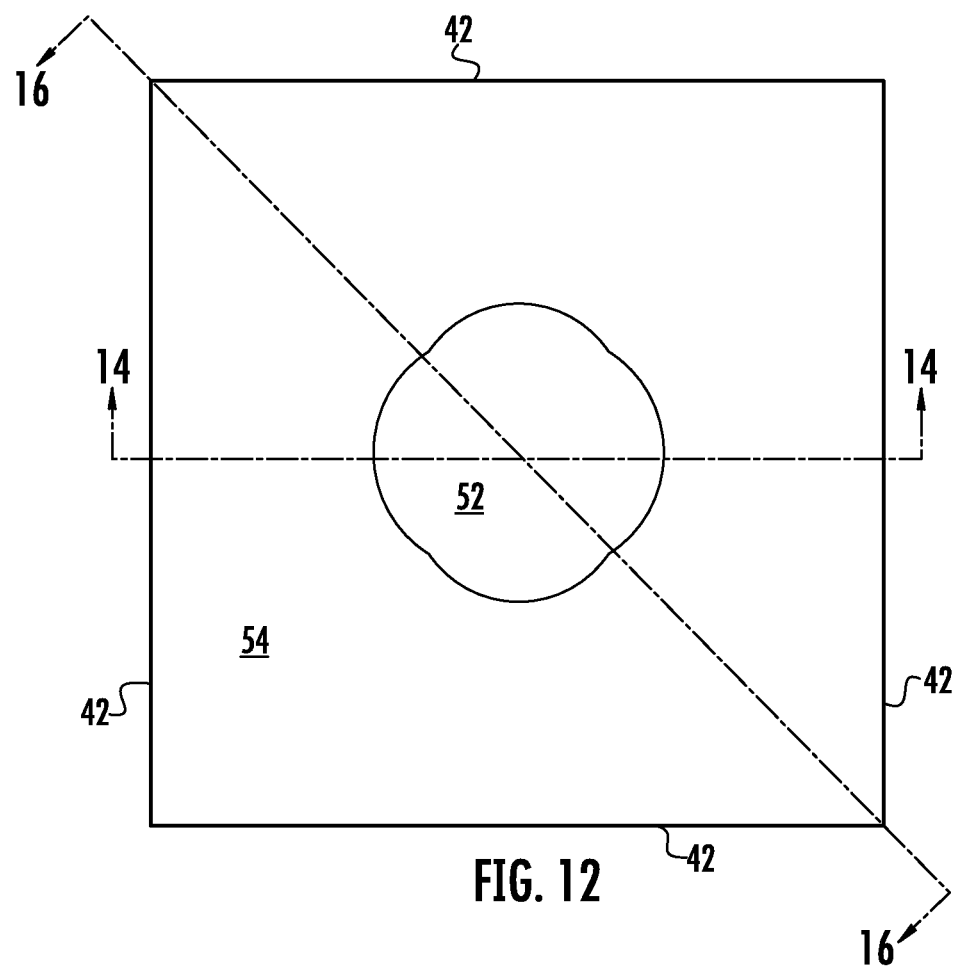
FIG. 12 is a top plan view of the beam forming optic of FIG. 10.
Figure 13:
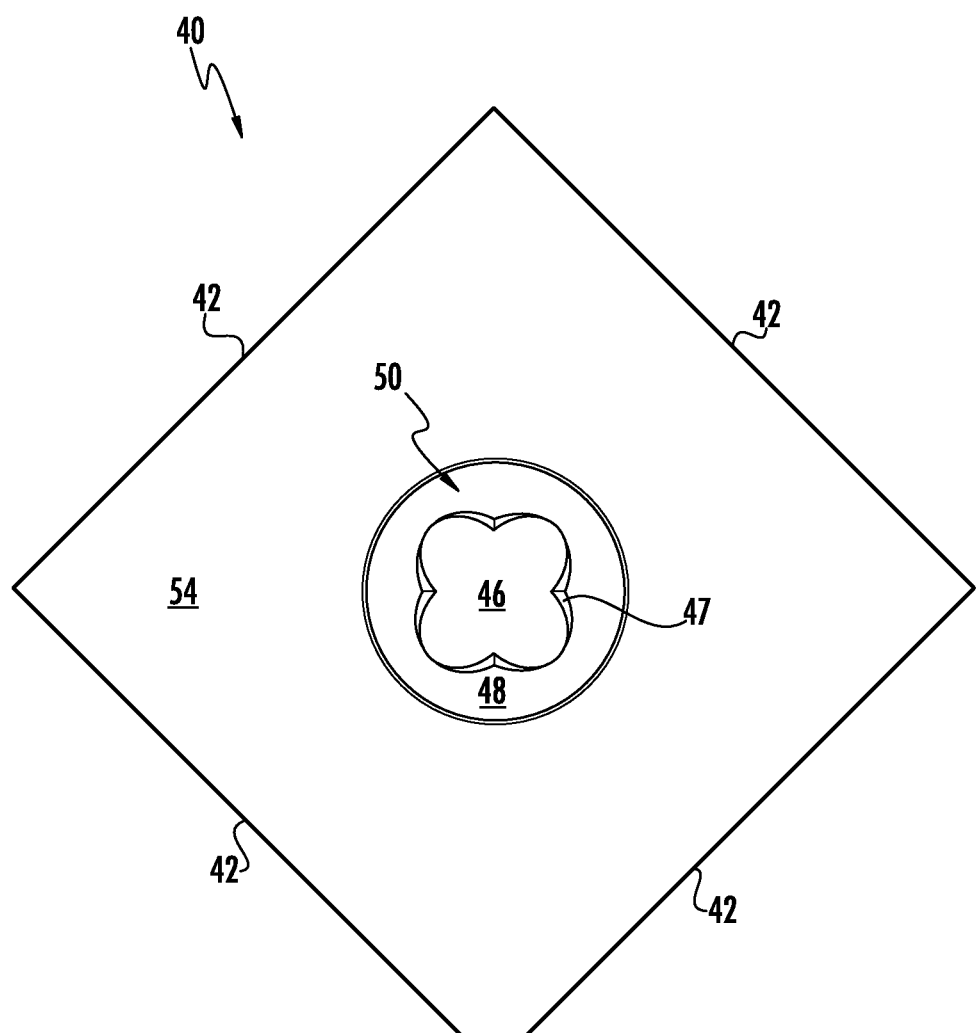
FIG. 13 is a bottom plan view of the beam forming optic of FIG. 10.

To ensure that light from the LED 18 is only re-directed by surfaces configured to produce light organized into a substantially collimated beam, the periphery of light entry surface 46 and light emission surface 52 are modified to permit light emitted from the LED at angular trajectories incident upon the internal reflecting surface 44 to pass the periphery of both light entry surface 46 and light emission surface 52. As best shown in FIGS. 11, 12, and 13, the result is that both light entry surface 46 and light emission surface 52 have a clover leaf, or lobed periphery, rather than a circular periphery as in prior art optical configurations. With reference to FIGS. 11 and 13, a peripheral bypass surface 47 is formed between light entry surfaces 46 and 48. Peripheral bypass surface 47 is defined by the path of light having the smallest angular displacement relative to axis A that will be incident upon internal reflecting surface 44. The resulting notches between lobes of the modified light entry surface 46 and light emission surface 52 permit light from the LED to fill the entire internal reflecting surface 44 while preventing light from being incident upon the inside of the square periphery 42 of the optic 40. As a result, groups of beam forming optics 40 will present what appears to be a seamless block of light, rather than bright spots surrounded by areas of darkness or reduced illumination.

Figure 14:
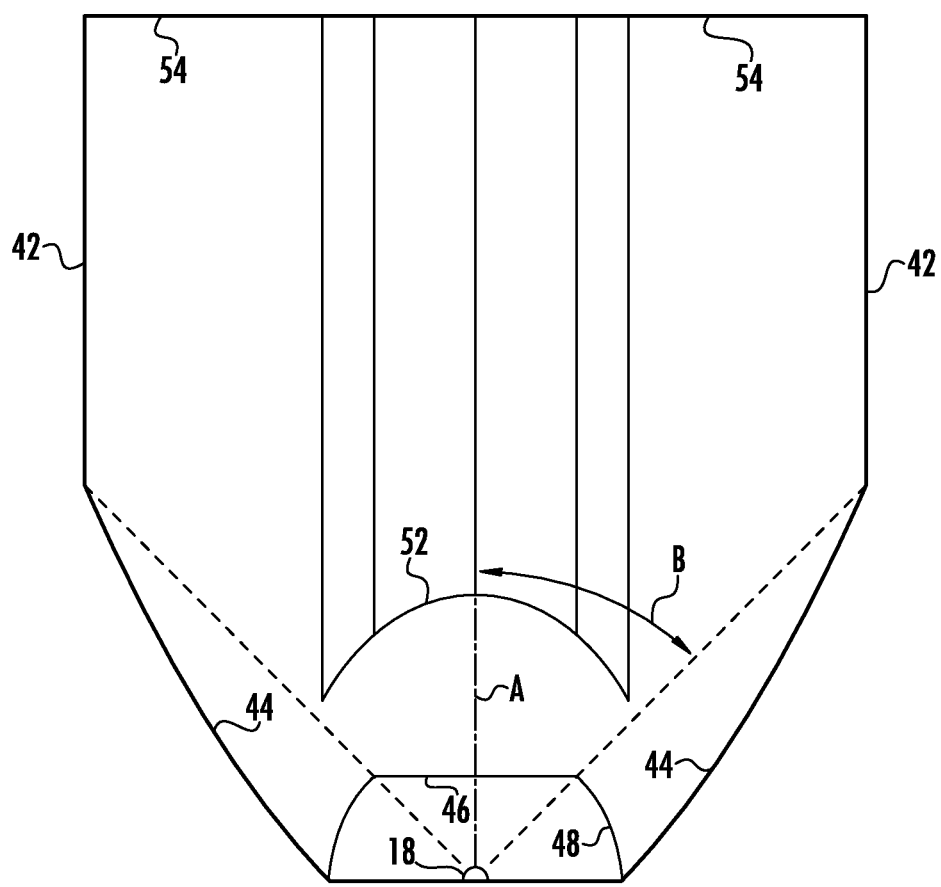
FIG. 14 is a longitudinal sectional view, partly in phantom and partly diagrammatic, of the beam forming optic of FIGS. 10-13, taken along line 14-14 of FIG. 12.
Figure 15:
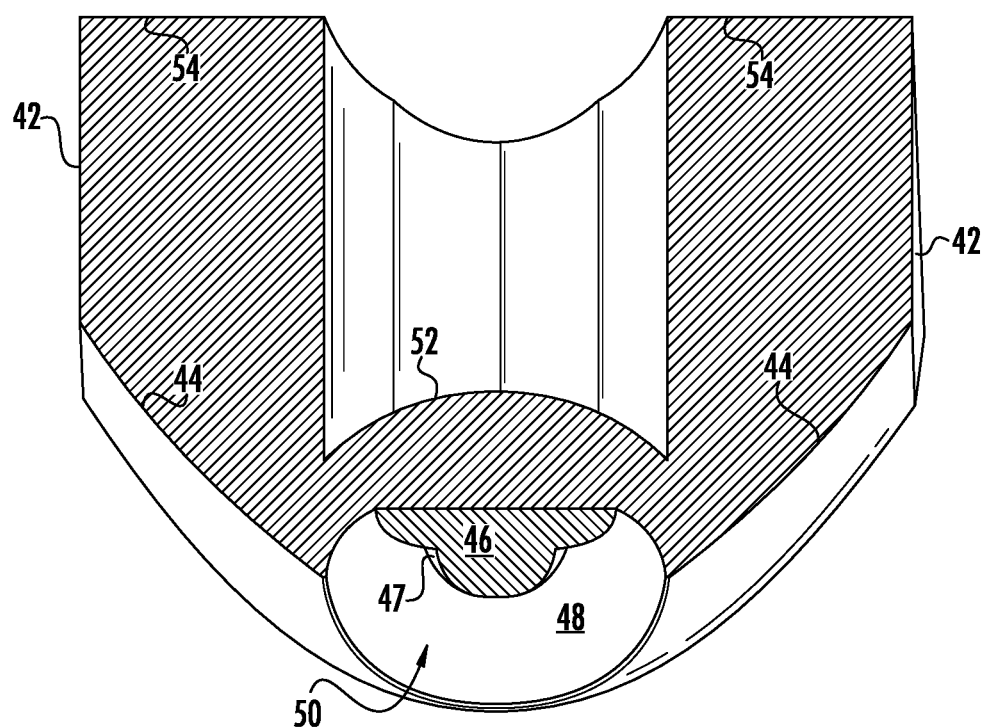
FIG. 15 is a bottom perspective view of the sectional illustration of FIG. 14.

FIGS. 14 and 15 illustrate a longitudinal sectional view through beam forming optic 40 taken along line 14-14 of FIG. 12, coinciding with the mid-point of each side of the square periphery 42. This position is where the light entry surface 46 has its largest diameter and actually extends to meet light entry surface 48. Light emitted from LED 18 at angles greater than angle B are incident upon internal reflecting surface 44 where they are collimated with respect to axis A and emitted through light emission surface 54. Light emission surface 54 is a planar surface arranged at right angles to the collimated light reflected from internal reflecting surface 44, a surface configuration selected to minimize changes to the this collimated light. Light emitted from the LED 18 at angles less than angle B are refracted into light entry surface 46 and emitted through light emission surface 52 in a direction substantially parallel with axis A.

Figure 16:
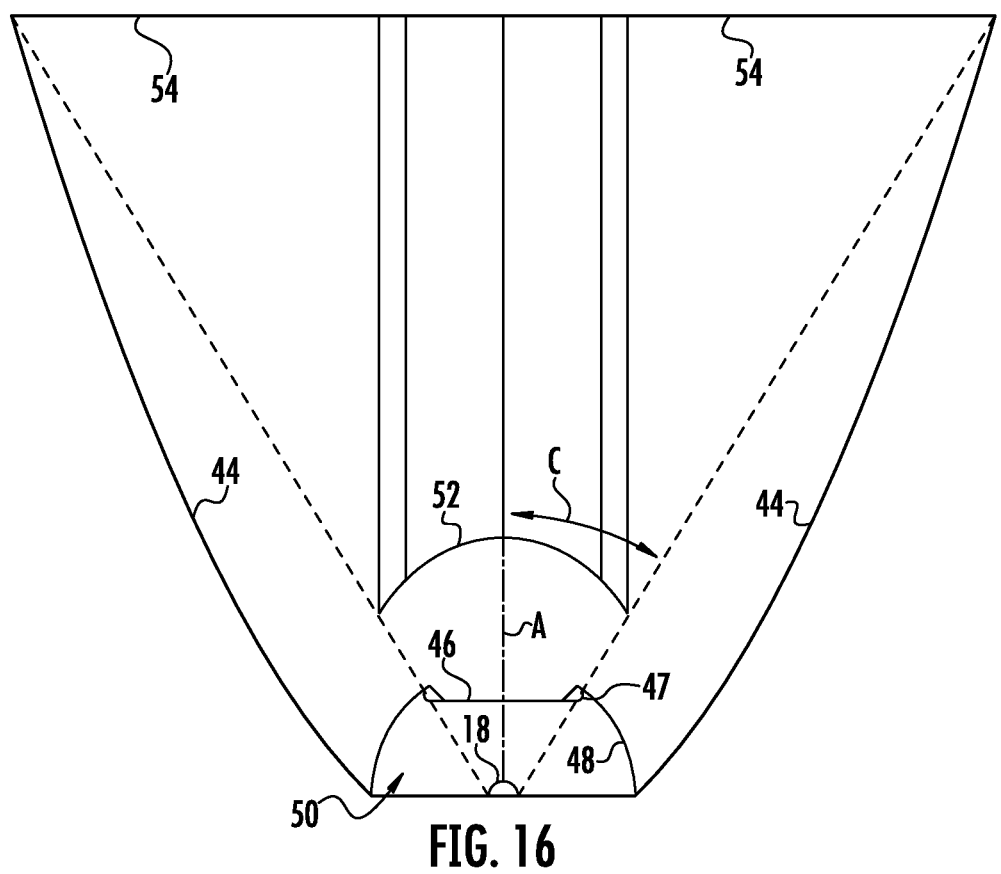
FIG. 16 is a longitudinal sectional view, partly in phantom and partly diagrammatic, of the beam forming optic of FIGS. 10-15, taken along line 16-16 of FIG. 12.
Figure 17:
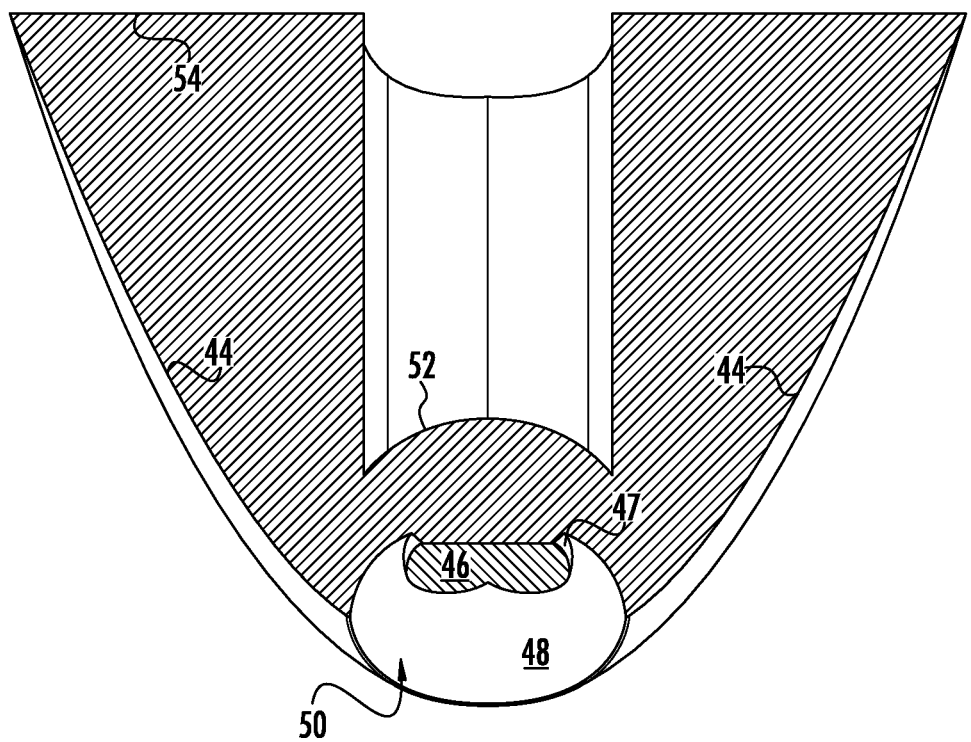
FIG. 17 is a bottom perspective view of the sectional illustration of FIG. 16.
Figure 18:
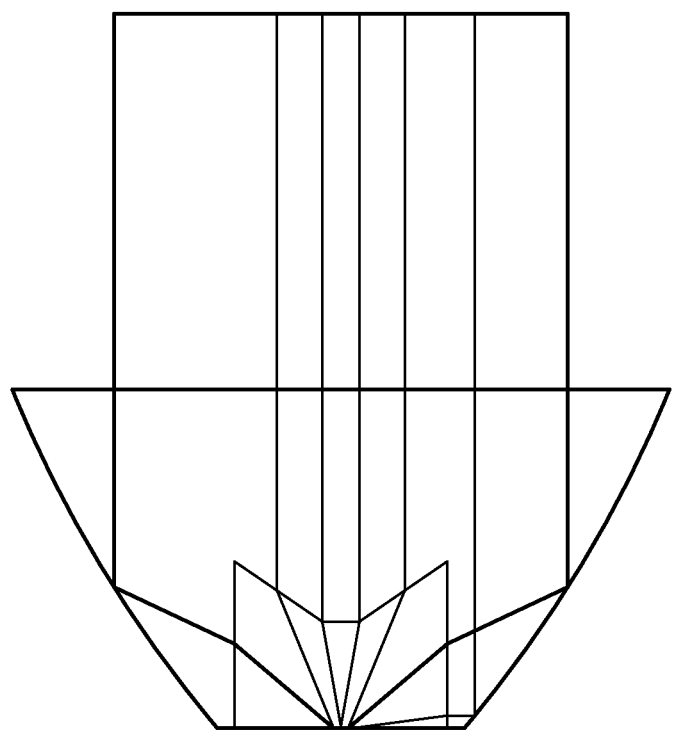
FIG. 18 is a longitudinal diagrammatic sectional view through a prior art collimator of a configuration frequently employed in conjunction with LED light sources.

FIGS. 16 and 17 illustrate a longitudinal sectional view through beam forming optic 40 taken along line 16-16 of FIG. 12, coinciding with a diagonal of the square periphery 42 of the optic 40. This position is where the light entry surface 46 has its smallest diameter, corresponding to the notches between lobes of the light entry surface 46 and light emission surface 52. Light emitted from LED at angles greater than angle C is incident upon internal reflecting surface 44, while light emitted at angles less than angle C is refracted into light entry surface 46. It will be observed that angle C is smaller than angle B and representative light rays in FIG. 16 extend to the top corner of internal reflecting surface 44, while representative light rays in FIG. 14 extend only so far as the lowest margin of the square periphery 42 of the optic 40.

Figure 19:
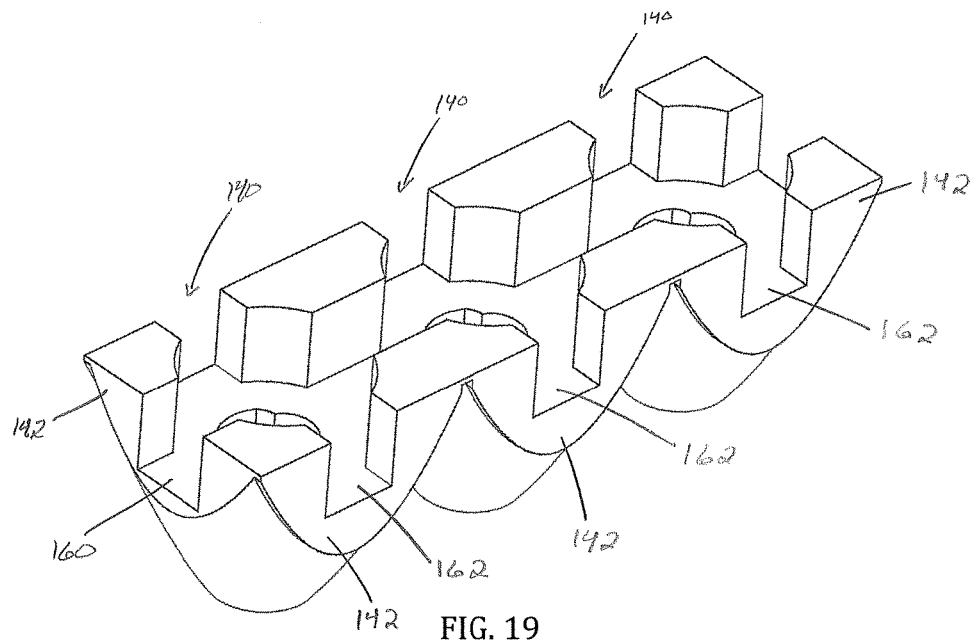
FIG. 19 is a top perspective view of an alternative beam forming optic according to aspects of the disclosure.
Figure 20:
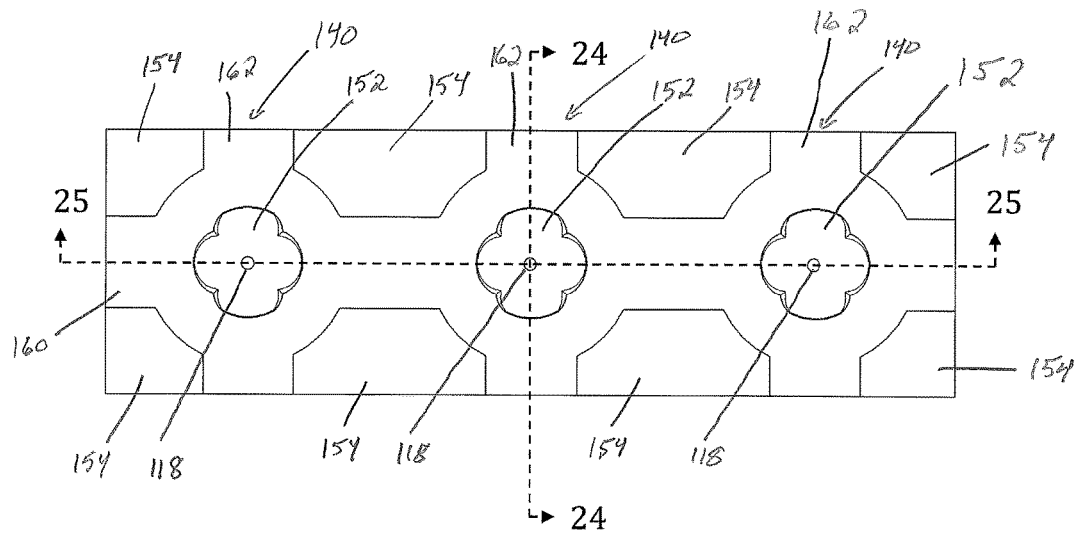
FIG. 20 is a top plan view of the beam forming optic of FIG. 19.

FIGS. 19-25 illustrate a third embodiment of a beam forming optic 140 according to aspects of the disclosure. Referring to FIGS. 19 and 20, there are three beam forming optics 140 joined in a linear arrangement. Each optic 140 contains a separate LED 118 aligned in a manner similar to the previous embodiments of the beam forming optics 10, 40. In beam forming optic 140, a substantial amount of material between the light emission surfaces 152, 154 is removed to form a castellated light emission surface. The square periphery 142 and the light emission surfaces 154 are interrupted by a void defined by longitudinal gap 160 and lateral channels 162. The longitudinal gap 160 and lateral channels 162 are perpendicular to one another and extend from light emission surface 154 towards the light emission surface 152. In the depicted embodiment, the longitudinal gap 160 intersects the lateral channels 162 at the optical axes of the LEDs 118 and the longitudinal gap 160 and lateral channels 162 terminate in a common plane. In the depicted embodiment, additional material is removed in the form of fillets or curves at the intersections of the longitudinal gap 160 and the lateral channels 162.

Figure 21:
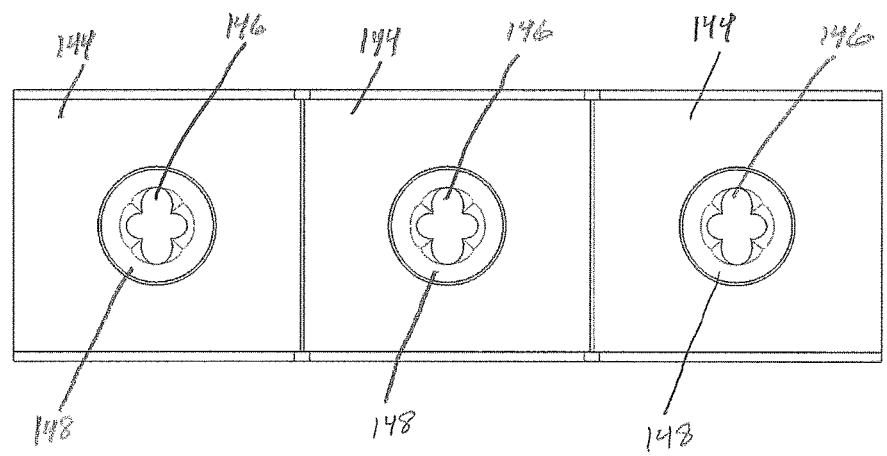
FIG. 21 is a bottom plan view of the beam forming optic of FIG. 19.

FIG. 21 depicts the light entry surfaces 146, 148 in greater detail. The light entry surfaces 146, 148 do not contact the longitudinal gap 160 or the lateral channels 162. The light entry surfaces 146, 148 are configured to redirect substantially all of the light emitted from the LED 118 either towards the light emission surface 152 or the internal reflecting surface 144.

Figure 24:
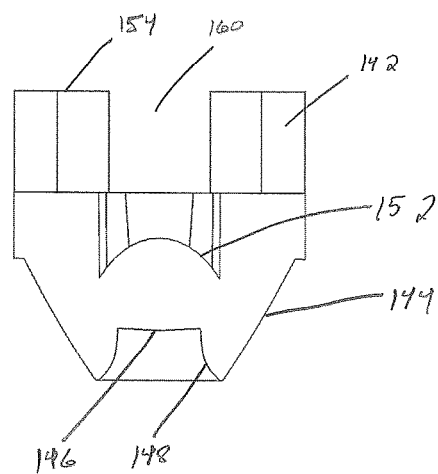
FIG. 24 is a longitudinal sectional view of the beam forming optic of FIGS. 19-23, taken along line 24-24 of FIG. 20.
Figure 25:
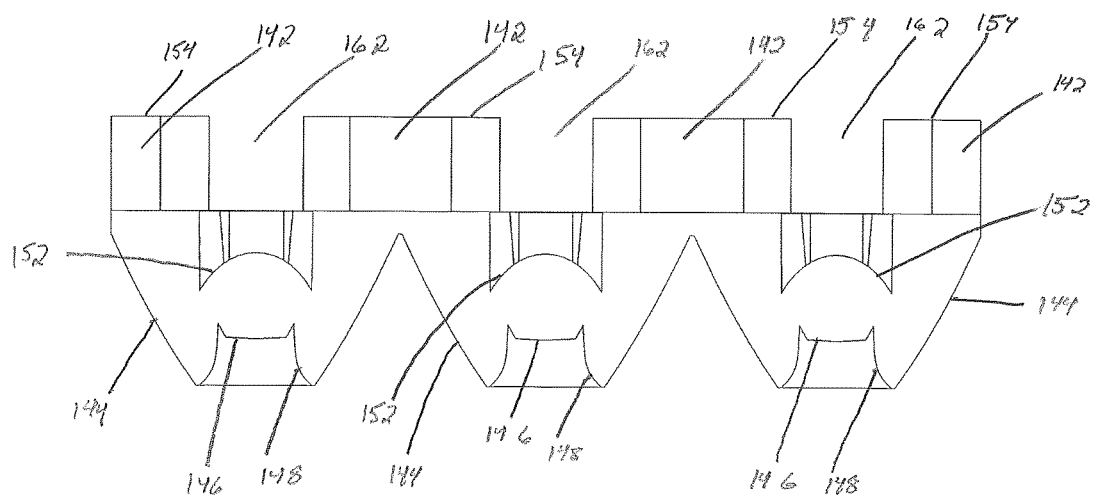
FIG. 25 is a lateral sectional view of the beam forming optic of FIGS. 19-23, taken along line 25-25 of FIG. 20.

The majority of the light emitted from the LED 118 refracts through the light entry surface 146 and the light emission surface 152 or refracts through the light entry surface 148 and reflects on the internal reflecting surface 144 (depicted in detail in FIGS. 24 and 25). The light that refracts through the light emission surface 152 and reflects on the internal reflecting surface 144 is collimated with respect to the optical axis of the LED 118. As a result, the light that passes through the void defined by longitudinal gap 160 and lateral channels 162 is already collimated by the beam forming optic 140.

Figure 22:
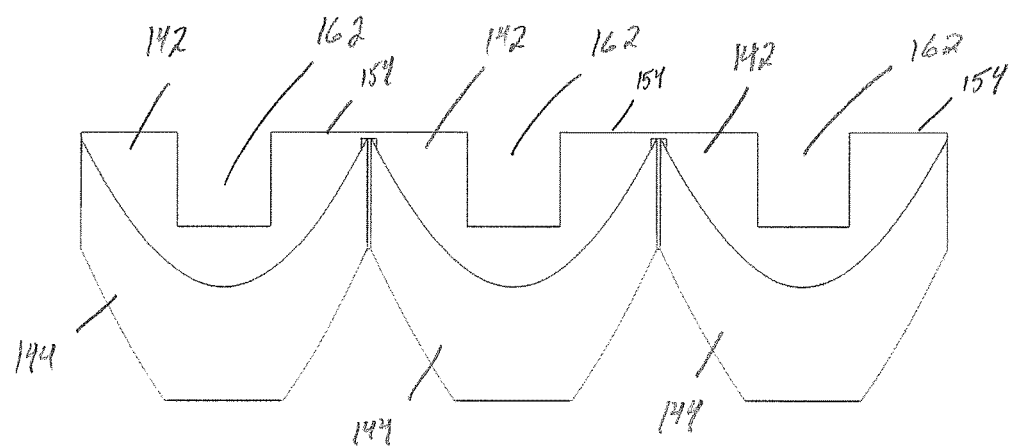
FIG. 22 is side view of the beam forming optic of FIG. 19.
Figure 23:
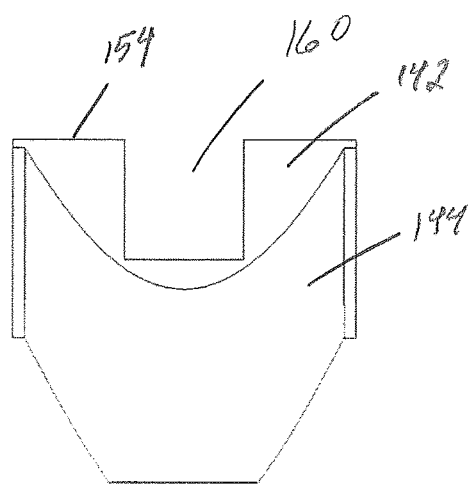
FIG. 23 is a front view of the beam forming optic of FIG. 19.

Referring to FIGS. 22 and 23, the lateral channels 162 and longitudinal gap 160 interrupt the square peripheries 140. In the depicted embodiment, the lateral channels 162 and longitudinal gap 160 are aligned at the center of each square periphery 142 and extend the same depth from the light emission surface 154. The cross-sectional dimensions of the lateral channels 162 and the longitudinal gap 160 are limited by the height of the square periphery 142. The lateral channels 162 and longitudinal gap 160 do not interrupt the internal reflecting surface 144.

The illustrated beam forming optics 10, 40, 140 are configured to ensure that light emitted from the LED is handled only by surfaces configured to form the desired collimated beam. The periphery of the lens handling narrow angle light is modified to permit light to fill the non-circular reflecting surface.

The disclosed beam forming optics 10, 40, 140 have been described in the context of a specific application, but those skilled in the art will recognize other uses. The disclosed beam forming optics 10, 40, 140 have been described with specific surface configurations, but is not limited to those specific shapes and those skilled in the art will recognize simple modifications to achieve the same or similar functionality. The description is by way of illustration and not limitation.

What is claimed:

1. A beam forming optic for use with an LED having an optical axis centered on an area of light emission from which light is emitted in a hemispherical pattern surrounding the optical axis, said light emitted to one side of a first plane behind said LED and perpendicular to the optical axis, said beam forming optic comprising:

a first light entry surface configured to cooperate with a first light emission surface to redirect a portion of the light emitted by said LED divergent from the optical axis into a direction substantially parallel with the optical axis;

a second light entry surface configured to cooperate with an internal reflecting surface and a second light emission surface to redirect a portion of the light emitted by said LED divergent from the optical axis into a direction substantially parallel with the optical axis;

a polygonal periphery extending from said internal reflecting surface to said second light emission surface; and a void defined by a lateral channel and a longitudinal gap perpendicular to said lateral channel, said lateral channel and longitudinal gap extending from said second light emission surface towards said first light emission surface, said lateral channel and longitudinal gap interrupting said polygonal periphery and intersecting the optical axis;

wherein said substantially all of the light emitted from said LED incident on said second light entry surface is incident on said internal reflecting surface, said first light entry surface and said second light entry surface cooperate to prevent substantially all of the light emitted from said LED from contacting said polygonal periphery, and a portion of said light emitted from said LED passes through said void.

2. The beam forming optic of claim 1, wherein said lateral channel and said longitudinal gap extend from said second light emission surface towards said first light emission surface and terminate in a common plane parallel to the first plane.

3. The beam forming optic of claim 1, wherein said first light emission surface is defined by a curve rotated about the optical axis.

4. The beam forming optic of claim 1, wherein said second light entry surface is defined by a sphere centered on the area of light emission of said LED.

5. The beam forming optic of claim 1, wherein said first light entry surface and said first light emission surface have a plurality of lobes extending away from the optical axis between a plurality of indentations, said polygonal periphery comprises a plurality of surfaces adjoined at corners, and said indentations are angularly aligned with said corners about the optical axis.

6. The beam forming optic of claim 1, wherein said polygonal periphery comprises a plurality of surfaces substantially perpendicular to the first plane.

7. The beam forming optic of claim 1, wherein said polygonal periphery is defined by a square centered on the optical axis.

8. The beam forming optic of claim 1, wherein said first light entry surface and said first light emission surface have lobes that radially project away from the optical axis to redirect light emitted by said LED that would otherwise be incident on said polygonal periphery.

9. The beam forming optic of claim 8, wherein said polygonal periphery comprises a plurality of surfaces and said surfaces are angularly aligned with said lobes about the optical axis.

10. An LED light assembly comprising:
an LED having an optical axis centered on an area of light emission from which narrow angle light and wide angle light is emitted in a hemispherical pattern surrounding the optical axis, said light emitted to one side of a first plane behind said LED and perpendicular to the optical axis; and an optic comprising at least first and second light entry surfaces, at least first and second light emission surfaces, an internal reflecting surface, a polygonal periphery, a longitudinal gap, and a lateral channel perpendicular to said longitudinal gap;

said first light entry surface redirects the narrow angle light through said first light emission surface;

said second light entry surface redirects the wide angle light towards said internal reflecting surface, said internal reflecting surface redirects the wide angle light through said second light emission surface;

said polygonal periphery extends between said internal reflecting surface and said second light emission surface; and said longitudinal gap and said lateral channel extending from said second light emission surface towards said first light emission surface and intersecting the optical axis;

wherein said narrow angle light and said wide angle light exit said optic substantially collimated with respect to the optical axis and said plurality of light entry surfaces, said plurality of light emission surfaces, and said internal reflecting surface cooperate to prevent light emitted from said LED from contacting said polygonal periphery.

11. The beam forming optic of claim 10, wherein said lateral channel and said longitudinal gap terminate in a common plane parallel to the first plane.

12. The LED light assembly of claim 10, wherein said first light emission surface is defined by a curve rotated about the optical axis.

13. The LED light assembly of claim 10, wherein said polygonal periphery comprises a plurality of surfaces substantially perpendicular to the first plane.

14. The LED light assembly of claim 10, wherein said second light entry surface has a plurality of indentations and said internal reflecting surface contains a plurality of peaks extending towards said second light emission surface, and said plurality of indentations are angularly aligned with said plurality of peaks about the optical axis.

15. The LED light assembly of claim 10, wherein said polygonal periphery comprises a plurality of surfaces including at least one planar surface and at least one curved surface.

16. The LED light assembly of claim 10, wherein said first light entry surface and said first light emission surface have lobes that radially project away from the optical axis to redirect the narrow angle light that would otherwise be incident on said polygonal periphery.

17. The LED light assembly of claim 16, wherein said polygonal periphery comprises a plurality of surfaces and said surfaces are angularly aligned with said lobes about the optical axis.

18. A beam forming optic for use with an LED having an optical axis centered on an area of light emission from which light is emitted in a hemispherical pattern surrounding the optical axis, said light emitted to one side of a first plane behind said LED and perpendicular to the optical axis, said beam forming optic comprising:
a first light entry surface configured to cooperate with a first light emission surface to redirect a portion of the light emitted by said LED divergent from the optical axis into a direction substantially parallel with the optical axis, said first light entry surface comprised of a planar surface with a noncircular periphery parallel to the first plane;

a second light entry surface configured to cooperate with an internal reflecting surface and a second light emission surface to redirect a portion of the light emitted by said LED divergent from the optical axis into a direction substantially parallel with the optical axis;

a polygonal periphery extending from said internal reflecting surface to said second light emission surface; and a void defined by a lateral channel extending from said second light emission surface towards said first light emission surface, said channel interrupts said square periphery and intersects the optical axis;

wherein said substantially all of the light emitted from said LED incident on said second light entry surface is incident on said internal reflecting surface, said first light entry surface and said second light entry surface cooperate to prevent substantially all of the light emitted from said LED from contacting said polygonal periphery, and a portion of said light emitted from said LED passes through said void.

* * * * *